May 5, 1964

J. A. ENGLERT ETAL 3,131,719

CLAMP RETAINED SEAT RINGS

Filed Dec. 18, 1961

Inventors.
Joseph A. Englert, &
Kurt B. Bredtschneider.
By Joseph O. Lange
Atty.

3,131,719
CLAMP RETAINED SEAT RINGS
Joseph A. Englert and Kurt B. Bredtschneider, Chicago, Ill., assignors to Crane Co., Chicago, Ill., a corporation of Illinois
Filed Dec. 18, 1961, Ser. No. 160,181
1 Claim. (Cl. 137—527)

This invention relates generally to seat rings for valves, pumps, and the like, and, more particularly, it is concerned with retaining means for fastening said rings to the valve or pump casing.

At the outset, in order to have a better appreciation of the background of this invention, it should be understood that for corrosive and erosive fluid service, it is obviously desirable, if at all possible, to replace worn-out valve seats, pump seat rings or the like in the field without the necessity for removing the valve or pump from the pipe line. In the latter connection, at the present time, the replacement of screwed-in or welded-in seat rings causes considerable difficulties. The removal of welded end seat rings particularly requires special grinding equipment which often is not available in the field or readily accessible.

It is therefore an important object of this invention to provide a means of attaching valve seat rings or the like more conveniently to the valve body or casing and thus permitting of seat replacement without substantial difficulty or inconvenience.

Further, in connection with present fastening methods employed for valve seat rings, it will be understood that it has been found that the casing seat rings are often distorted and therefore the seat area frequently has to be factory-reconditioned after the new seat ring has been attached to the valve body or the like.

With the present invention, in striking contrast, and as will hereinafter become more readily apparent, the method of attachment avoids such objectionable seat ring distortion and also the expensive reconditioning referred to accompanied frequently with even more costly shut-downs of the pipe line involved in the field of service.

It is another important object of the invention to provide means for fastening valve seat rings or the like with a two-piece clamp ring in which the seat ring can easily and conveniently be drawn into tight fluid sealing contact with the valve body or casing and without objectionable strain or distortion of the casing seat area or the seat ring itself.

A further object provides for a fastening means in which the removal of the objectionably worn seat ring and the installation of a new ring can easily be made in the field.

A further important object is to provide for a ring fastening means such as a divided coupling or clamp in which the latter may also function as the carrier of the swing axis of the valve as for instance in a swing check valve.

Another important object of the invention is to provide for a suitable retaining means for seat rings in which the valve seat and the swing disc or closure member or both, can be conveniently tested outside the valve body and subsequently installed within the casing as a complete unit with little or no difficulty.

Other important objects and advantages will become more readily apparent upon proceeding with a description thereof read in light of the accompanying drawings, in which.

Figure 1:
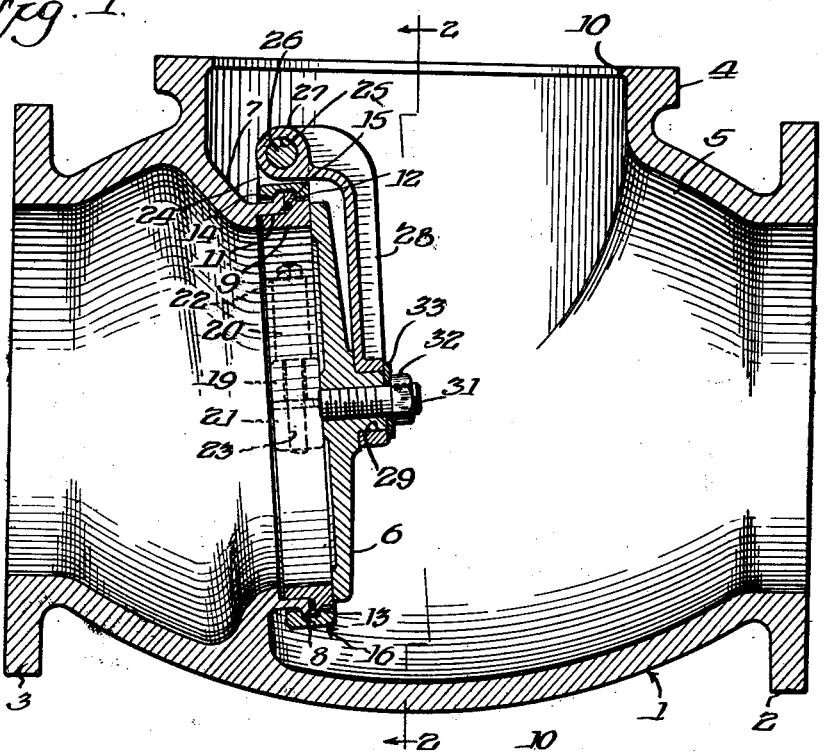
FIG. 1 is a sectional assembly view of a swing check valve embodying our invention.
Figure 2:
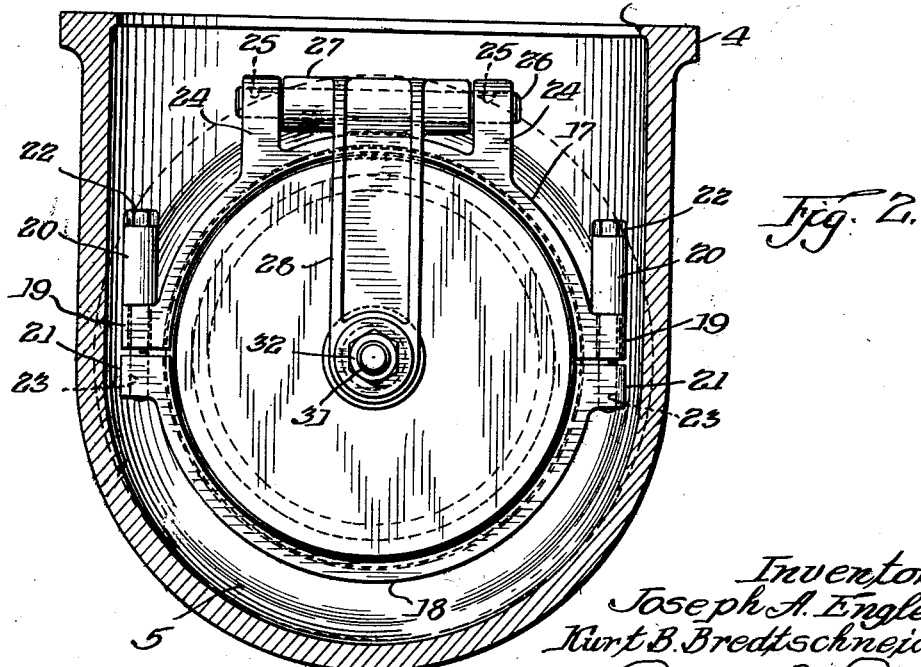
FIG. 2 is a transverse sectional assembly view taken on the line 2—2 of FIG. 1.

Referring now to the drawings and particularly to FIGS. 1 and 2, a swing check valve is shown having the valve casing 1 with the usual end flanges 2 and 3 for attachment to a pipe line (not shown). The upper portion of the valve for space consideration purposes here is shown uncapped at opening 10. It will be understood that the flange 4 is usually provided with bolt means for its attachment to a cap or bonnet cover whereby to enclose the valve chamber 5 of the casing within which the swingable valve closure member 6 is mounted for movement in response to fluid flow therethrough. The valve casing is provided with the annular bridge wall 7 terminating at its inner portion with the annular flange 8. The latter portion is recessed to receive the body seat ring 9 received within the recess in the flange portion 8 and shouldering against the annular surface 12. A fluid sealing ring 13 such as an O-ring of annular configuration is preferably mounted in an annular groove between the member 9 and the surface 12 as shown. The said sealing ring thus maintains a fluid-tight joint between the member 9 and the flange surface 12.

Here a significant contribution of this invention follows in that in order to hold the seat ring firmly in place against the annular surface 12, the casing annular flange portion 8 is provided with the outer slightly inclined annular surface 14. Similarly, the casing seat ring 9 is provided with the similarly inclined annular surface 15, but note that its angle of inclination is opposite to that of the surface 14. Fitted snugly over and engaging the inclined surfaces 14 and 15 is the segmental or divided clamp ring generally designated 16. The clamp ring consists of upper and lower segments 17 and 18, as shown more clearly in FIG. 2. These segments preferably are joined at their oppositely disposed flanged portions 19 and 21 by means of the threaded bolts 22 threadedly engaging the thickened or spacer washer 20 and the lower retainer portion at 23 as indicated. It will therefore be apparent that by tightening the bolts 22, the respective segments 17 and 18 of the clamp ring will be drawn together over the inclined annular surfaces 14 and 15. The respective clamp ring segments 17 and 18 are provided with inner complementary surfaces abutting the surfaces 14 and 15, thereby to accomplish said attachment when segments 17 and 18 are drawn together.

A novel element of the construction lies in the provision that at the upper portion of the segment 17 and preferably integral therewith are the end disposed hinge lugs preferably integral therewith and joined as at 24. Apertured as at 25 to receive the hinge pin 26, the latter member engages the hub 27 of the hinge 28. The said hinge is swivelably attached at 29 by means of the bolt 31, nut 32 and retaining washer 33. Thus, it will be apparent that not only is the seat ring 9 easily renewable when replacement becomes necessary by mere disassembly of the clamp ring 16, but the bolt means for effecting such attachment is easily accessible from the upper portion of the valve through the cap or bonnet opening 10. Further, it will also be apparent that upon removal of the bolts 22, the complete assembly consisting of the closure member 6 together with the hinge 28 and the hinge mounting 27 is removable as a unit. Therefore, when it becomes necessary to replace the valve with a new seat ring or other related parts, such parts and including the closure member 6 can actually be removed and tested outside of and independently of the valve casing with the repaired or the replacement valve seat ring without need for disturbing the valve casing in its positioning on the pipe line.

Clearly, many benefits flow from such durable construction in addition to its economy and the ease in which parts replacements may be made in the field.

Many other valves lend themselves readily to the adaptation of the instant type of seat mounting and method of attachment.

While only a single embodiment has been shown and described, it will be clear that this is only for purpose of showing a broad application to a number of valve installations. There may be many others additionally, as, for example, in pumps or other pressure vessels where easy economical renewability of seats is desirable. The invention should therefore be measured by the scope of the appended claim.

We claim:

In a mechanism providing seats and attachment means therefor in a valve;

having a ported casing, at least an inner end portion of the valve port being defined by an annular seat ring removably attached to engage the said inner end of the ported portion of the casing;

the said seat ring and an annular portion of the said casing adjacent the ported end portion thereof having substantially transversely extending annular flanges thereon with rear surfaces slightly inclined annularly to the central axis of the casing port;

the combination therewith of a closure member swingably mounted in the casing for cooperation with said removable seat ring;

each of the said annular surfaces of the said seat ring and said casing being inclined in opposite directions;

means for effecting attachment of the seat ring to the said casing for cooperation with said closure member comprising a divided coupling therefor having oppositely disposed inner inclined annular surfaces spaced apart and coinciding with said annular inclined surfaces of the said casing and seat ring;

the means for swingably mounting said closure member including hinge means connected to said closure member consisting respectively of end disposed lugs and a hinge pin thereof on at least one portion of the said divided coupling;

the said seat ring, closure member and hinge means being installable as a unit relative to said casing upon drawing said divided coupling over said seat ring.

References Cited in the file of this patent

UNITED STATES PATENTS

| | | |
|---|---|---|
| 1,222,081 | Demilt | Apr. 10, 1917 |
| 1,230,634 | White | June 19, 1917 |
| 2,439,024 | Ruebel | Apr. 6, 1948 |
| 2,685,889 | Leighton | Aug. 10, 1954 |
| 2,717,001 | Perrault | Sept. 6, 1955 |
| 2,730,119 | Bredtschneider | Jan. 10, 1956 |
| 2,763,287 | Dopp et al. | Sept. 18, 1956 |
| 2,773,709 | Smith | Dec. 11, 1956 |
| 2,840,337 | Sasserson et al. | June 24, 1958 |
| 3,014,740 | Bogosian et al. | Dec. 26, 1961 |